June 4, 1929. C. E. HILL Re. 17,321

SPRAY NOZZLE

Original Filed March 13, 1922

Inventor:
CLYDE E. HILL,
By John H. Bunnings
His Attorney.

Reissued June 4, 1929. Re. 17,321

UNITED STATES PATENT OFFICE.

CLYDE E. HILL, OF DENVER, COLORADO.

SPRAY NOZZLE.

Original No. 1,502,822, dated July 29, 1924, Serial No. 543,399, filed March 13, 1922. Application for reissue filed October 21, 1925. Serial No. 64,059.

This invention relates to spray nozzles, and has special reference to a nozzle adapted to be used for spraying parkings.

It is well known that more or less difficulty is always experienced in properly sprinkling parkings and parts of lawns which lie adjacent to a sidewalk, for the reason that most sprays do not throw the spray along a straight line but rather in curved lines, with the result that if the entire strip of grass along the sidewalk is to be covered with water, the water will also have to be sprayed upon and over the sidewalk, which is objectionable to pedestrians and besides results in a waste of water.

It is an object of this invention to produce a nozzle that is so designed and constructed that it will throw the spray over a substantially rectangular area, one side of which is straight, so that the lawn or parking can be sprinkled up to the line of the sidewalk without the necessity of wetting the latter.

Another object is to so construct the deflector that different parts thereof are disposed at different angles, whereby deflections of the stream path caused by the deflector parts tend to counteract or affect each other in order to direct the spray in the desired directions or field.

Another object is to so mount the nozzle in its support that it is enabled to move freely about the axis of the stream path issuing from its aperture and on the deflector, without affecting its mounting or position with respect to the deflector.

Another object is to so mount the deflector that it can be readily adjusted without changing the position of the sprinkler as a whole.

It is a further object of this invention to produce a spray nozzle of substantial and simple construction, which can be easily and cheaply made and which can be readily adjusted.

Further objects will appear from the detail description taken in connection with the accompanying drawings.

In order to more clearly describe my invention, I shall have reference to the attached drawing in which.

The same reference numerals will be used to designate the same parts throughout the several views.

Figure 1:
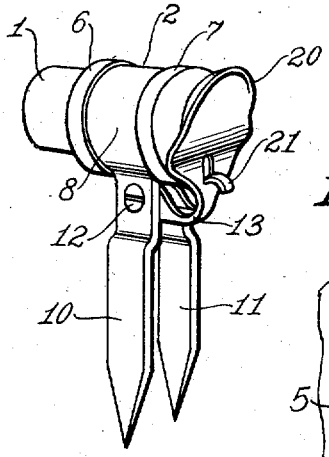
Figure 1 is a perspective view of my improved nozzle.

Numeral 1 represents an ordinary garden hose and 2 my improved nozzle as a whole. My improved nozzle consists of a member 3 which is made in the general shape of a screw cap, whose inner surface 4 is threaded so as to adapt it to be applied to the usual threaded hose coupling. The end of member 3 has a suitable opening 5 through which the stream of water emerges. Near each end of nozzle 2 are outwardly projecting flanges 6 and 7 which serve as abutments or guides for holding the strap 8 in place. Strap 8 consists of a strip of metal which is bent intermediate its ends into an arcuate shape, whose diameter is such that it will properly fit the portion 9 of the nozzle which lies intermediate flanges 6 and 7, and permit rotation of the nozzle with respect thereto. The ends 10 and 11 of strap 8 are spaced apart and pointed so that they may be readily inserted into the surface of the ground and hold the nozzle in place. Secured between the sides of strap 8 by means of a suitable bolt 12, is an adjustable deflector plate 13 which I will now describe.

Figure 2:
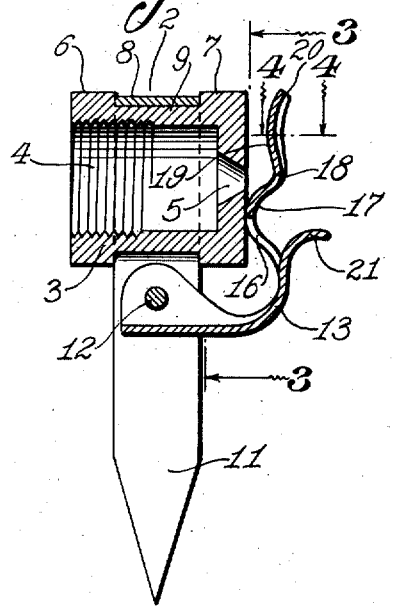
Figure 2 is a vertical longitudinal section taken on line 2—2, Figure 3.

The lower end of plate 13 is provided with a pair of ears 14 and 15 whose outside surfaces have frictional engagement with the inner surfaces of strap 8, and are provided with openings for the reception of bolt 12. Plate 13 is curved upwardly and rearwardly to a point indicated by numeral 16, and thence extends substantially vertically for a short distance to the point marked 17 which is about on a level with the lower edge of opening 5. From point 17 the plate is inclined upwardly and forwardly for a short distance, and at 18 it is bent rearwardly, all as shown in Figure 2. The edges of the plate above point 18 are curved forwardly as indicated at 20.

The operation of my nozzle is as follows: Part of the stream emerging from opening 5 impinges on the inclined surface between 17 and 18 and is given an upward direction. At 18 part of the stream encounters the reverse curve and this causes a portion of the water to be forced out to the sides and to emerge from the nozzle in a line substantially at right angles to the axis of the opening 5 as hereafter more fully explained. The remaining portion of the water will be forced upwardly and to the sides of the plate, forming a fine spray which strikes the ground over a substantially rectangular area, in the manner shown in Figure 5. A tongue 21 is cut from the plate 13 and bent outwardly to form a handle by means of which the plate may be adjusted. By tilting the plate 13 on the bolt 12, different effects may be produced, and the plate is to be adjusted so as to obtain the most desirable results.

Figure 6:
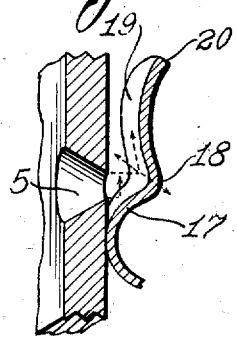
Figure 6 is a perspective diagram illustrating the action of the spray.
Figure 5:
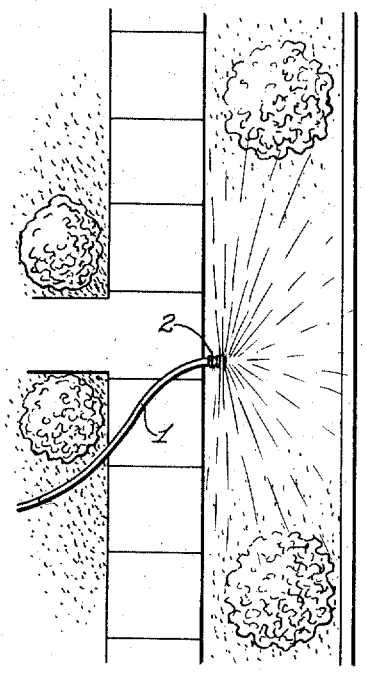
Figure 5 is a plan view, showing my nozzle employed for sprinkling a parking between the sidewalk and the curb.
Figure 3:
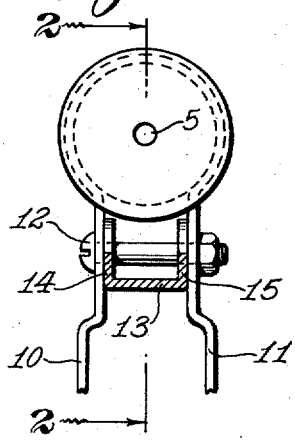
Figure 3 is a section taken on line 3—3, Figure 2.
Figure 4:
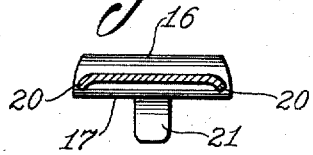
Figure 4 is a section taken on line 4—4, Figure 2.

It will be noted, particularly by reference to Figure 6, that that part of the deflector plate which lies within the stream path extends at an angle thereto at the lower portion thereof, and that the surface of said plate changes its direction within the stream path, so that the upper portion of the plate changes its angular direction and above the point 18 it takes an opposite inclination, still within the stream path. Accordingly, the lower or angular portion of the plate will deflect the stream upwardly while the upper portion will deflect the stream laterally in substantially all directions transversely to the axis of the stream. The upper or transverse portion of the plate, acting by itself, would deflect the stream in all directions transversely of the axis; i. e. downwardly as well as laterally and upwardly. The action of the angular portion of the plate, however, by deflecting the lower portion of the stream upwardly, not only counteracts and prevents this downward deflection, but is itself counteracted thereby, with the result that the water is forced out at the sides of the spray with great force. As a consequence, any downward spray of water is entirely eliminated so that there is no erosion of the ground around the spray. At the same time the sidewise energy of the spray is increased so that a greater area may be covered, as shown in Figure 5.

It will further be seen that the deflector not only has a part (17—18) extending in a general direction along the stream path, or more specifically diagonally therein and therealong, but a deflector part (18—19) extends at an opposite inclination to the stream path close to a small aperture in the nozzle in order to deflect the stream. Moreover, as pointed out above, the direction of the deflector changes in the stream path, with the result that the stream is deflected laterally and upwardly within the desired field or area.

The nozzle is journalled for free movement in its support about the axis of the nozzle and the stream path; this is accomplished by providing a comparatively rigid bearing 13 between the legs 11, so that the screw 12 can be tightened in order to leave the strap sufficiently loose in order to leave the nozzle free. This is advantageous, because any twisting of the hose will permit the nozzle to move freely therewith, without disturbing the alinement of the nozzle aperture with the deflector and without tearing the support loose. The frictional fit of the deflector between the legs and within the support furthermore permits ready adjustment of the deflector without disturbing the mounting, while the frictional fit provides means for retaining the deflector in adjusted position.

From the above it will appear that I have provided a simple spray nozzle that can be cheaply made and easily assembled, and which is so constructed that it will throw the water along a substantially straight line along one side of the area sprayed; thus making it especially well adapted for use in spraying parkings and other parts of lawns adjacent to sidewalks.

It is obvious that various changes may be made in details of construction without departing from the spirit of this invention; it is, therefore, to be understood that this invention is not to be limited to the specific details shown and described.

Having thus described the invention, what is claimed is:

1. A spray nozzle, comprising in combination, a body member adapted to be secured to the end of a hose and provided with an opening in one end thereof, a deflector plate hingedly secured thereto and extending upwardly in front of said opening, a portion of said plate directly in front of the opening being upwardly and forwardly inclined, a portion directly above said inclined portion being upwardly and rearwardly inclined, and the remaining portion being upwardly and forwardly inclined.

2. A spray nozzle, comprising in combination, a nozzle having a substantially plane end, an opening in said end, and a plate projecting upwardly in front of said opening, said plate being transversely bent, and having an upwardly and forwardly inclined portion directly in front of said opening, an upwardly and rearwardly inclined portion directly over said first named inclined portion, and an upwardly and forwardly inclined portion above the second mentioned inclined portion.

3. The combination with a spray nozzle having a small aperture, of a deflector extending angularly across the lower portion of the stream path adapted to deflect the lower portion of the stream upwardly, the surface of said deflector changing its direction within the stream to a position adapted to deflect the upper portion of the stream downwardly.

4. The combination with a spray nozzle having a small aperture, of a deflector extending into the stream path, a part of the deflector surface extending forwardly at an angle to the stream path, another part of the deflecting surface extending at an opposite inclination to the stream path and a zone connecting said surface parts having a line therein extending perpendicularly across and within the stream path.

5. The combination with a spray nozzle having a small aperture, of a deflector extending across the stream path, a part of the deflector surface extending forwardly at an angle to the stream path and another continuing part of the deflecting surface extending at an opposite inclination to the stream path, the surface of said deflector changing within the stream path.

6. The combination with a spray nozzle having a small aperture, of a deflector extending across the stream path and having different parts thereof within the stream path disposed at opposite inclinations to said path and in converging relation so that deflections of the stream caused by said parts tend to counteract each other in order to direct the spray laterally of the stream path.

7. A spray nozzle, comprising in combination, a body member adapted to be secured to the end of a hose and provided with an opening in the end thereof, and a deflector plate hingedly secured thereto and extending upwardly in front of said opening, a portion of said plate directly in front of the opening being upwardly and forwardly inclined, and a portion directly above said inclined portion being upwardly and rearwardly inclined.

8. A spray nozzle, comprising in combination, a nozzle having a substantially plane end and an opening in said end, and a plate projecting upwardly in front of said opening, said plate being transversely bent, and having an upwardly and forwardly inclined portion directly in front of said opening, and an upwardly and rearwardly inclined portion directly over said first named inclined portion.

In testimony whereof I have hereunto affixed my signature this 14th day of October, 1925.

CLYDE E. HILL.